United States Patent [19]

Nozick

[11] Patent Number: 5,388,999
[45] Date of Patent: Feb. 14, 1995

[54] CONNECTION SYSTEM USING TERMINAL STRIPS FOR USE IN HIGH BIT RATE COMMUNICATIONS

[76] Inventor: Jacques Nozick, 28, rue Broca, 75005 Paris, France

[21] Appl. No.: 152,138

[22] Filed: Nov. 16, 1993

[30] Foreign Application Priority Data

Nov. 20, 1992 [FR] France ................... 9213937

[51] Int. Cl.⁶ ..................... H01R 9/26; H01R 13/648
[52] U.S. Cl. ................................. 439/94; 439/716; 439/931
[58] Field of Search ............... 439/94, 716, 717, 607, 439/931

[56] References Cited

U.S. PATENT DOCUMENTS

| | | | |
|---|---|---|---|
| 4,514,586 | 4/1985 | Waggoner | 174/35 MS |
| 4,907,263 | 3/1990 | Neuwirth | 439/817 |
| 4,946,397 | 8/1990 | Grasser | 439/716 |
| 5,033,974 | 7/1991 | Biederstedt et al. | 439/94 |
| 5,049,094 | 9/1991 | Heng et al. | 439/94 |

FOREIGN PATENT DOCUMENTS

| | | | |
|---|---|---|---|
| 0071264 | 2/1983 | European Pat. Off. . | |
| 403666 | 5/1989 | European Pat. Off. | 439/716 |
| 0461454 | 12/1991 | European Pat. Off. . | |
| 0489642 | 6/1992 | European Pat. Off. . | |
| 2340656 | 9/1977 | France . | |
| 133824 | 3/1985 | France . | |
| 2650709 | 2/1991 | France | 439/94 |
| 2667199 | 3/1992 | France . | |

Primary Examiner—Gary F. Paumen
Attorney, Agent, or Firm—Sughrue, Mion, Zinn, Macpeak & Seas

[57] ABSTRACT

A connection system comprising a terminal strip of insulating material and a metal rail connected to ground, said terminal strip having two substantially rectangular and generally planar sides extending perpendicularly to the longitudinal direction of the rail, two lateral faces, a front face provided with electrical contacts, and a back face fixed to the rail, each of the sides having an outside surface, wherein the outside surfaces of said sides of the strip are formed with respective electrically conductive layers in electrical contact with the rail.

15 Claims, 11 Drawing Sheets

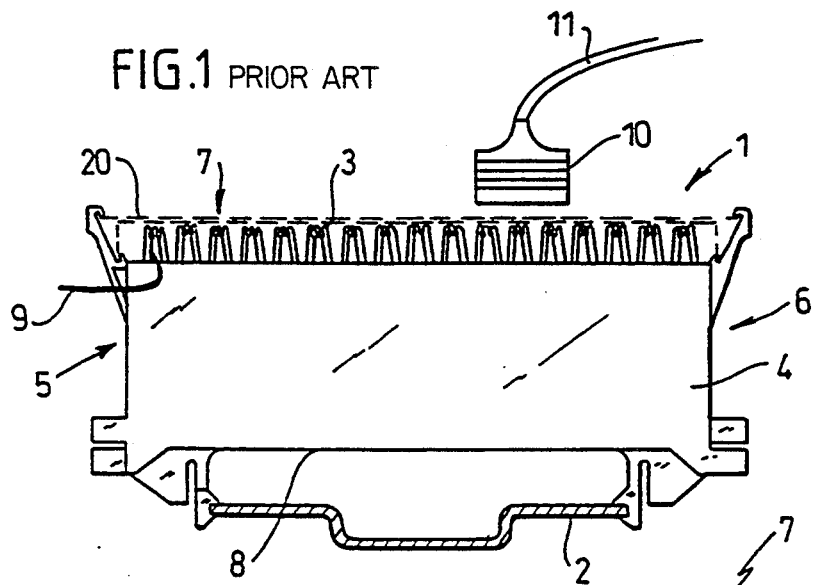
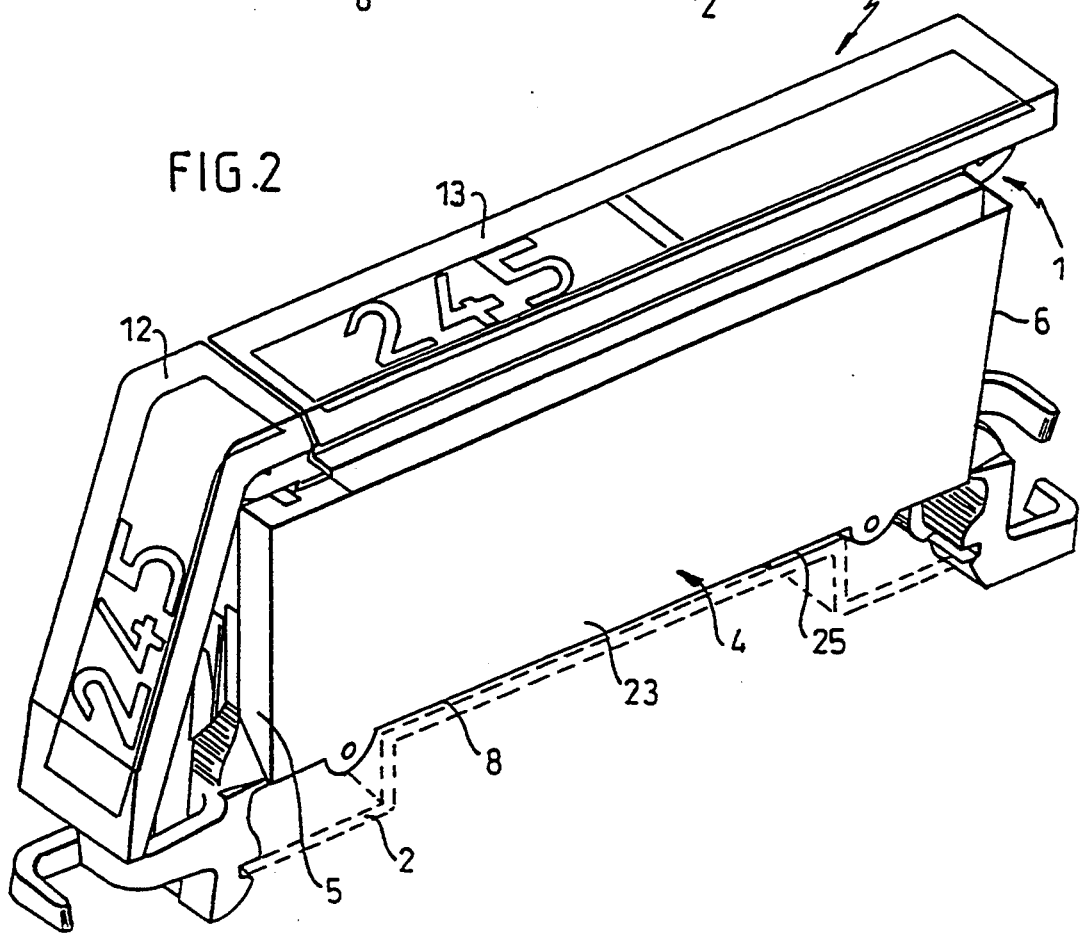

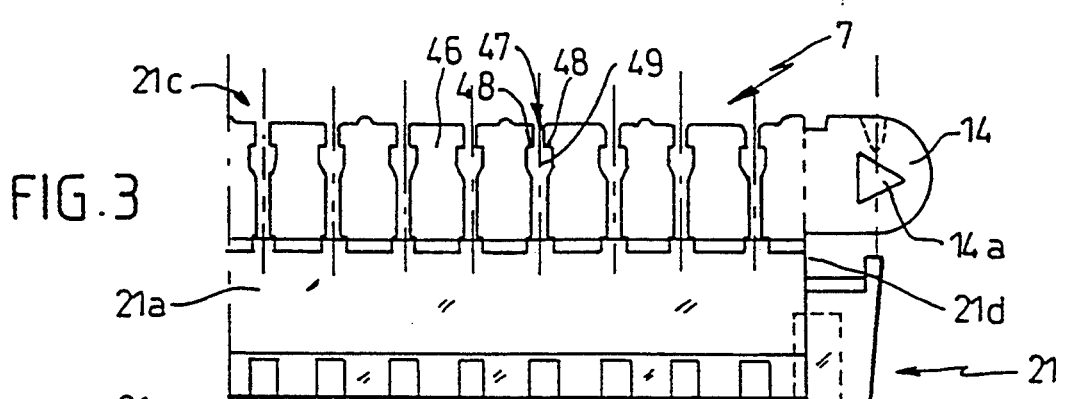
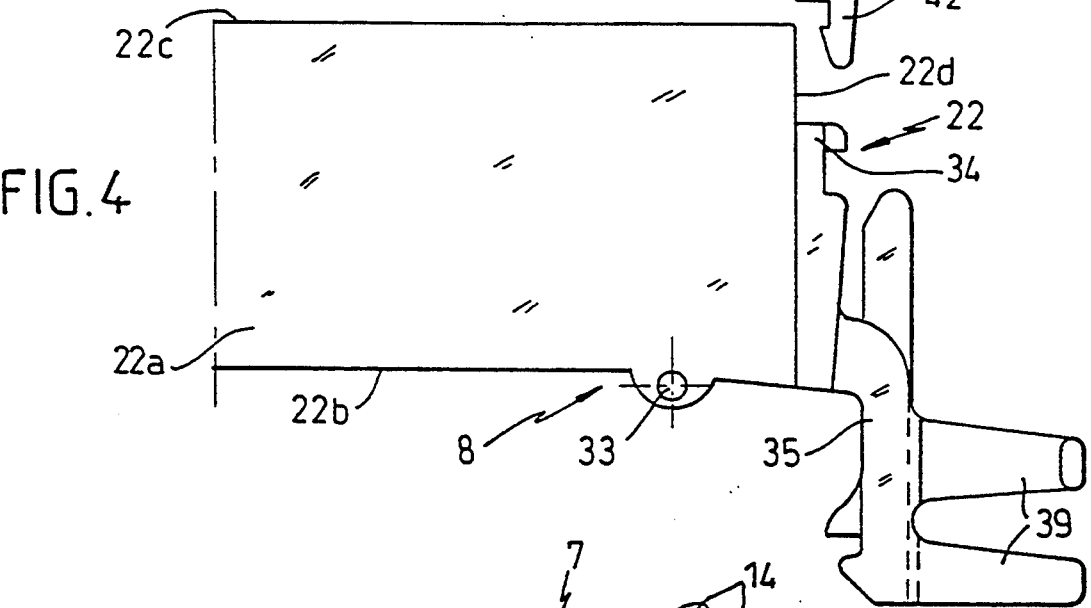
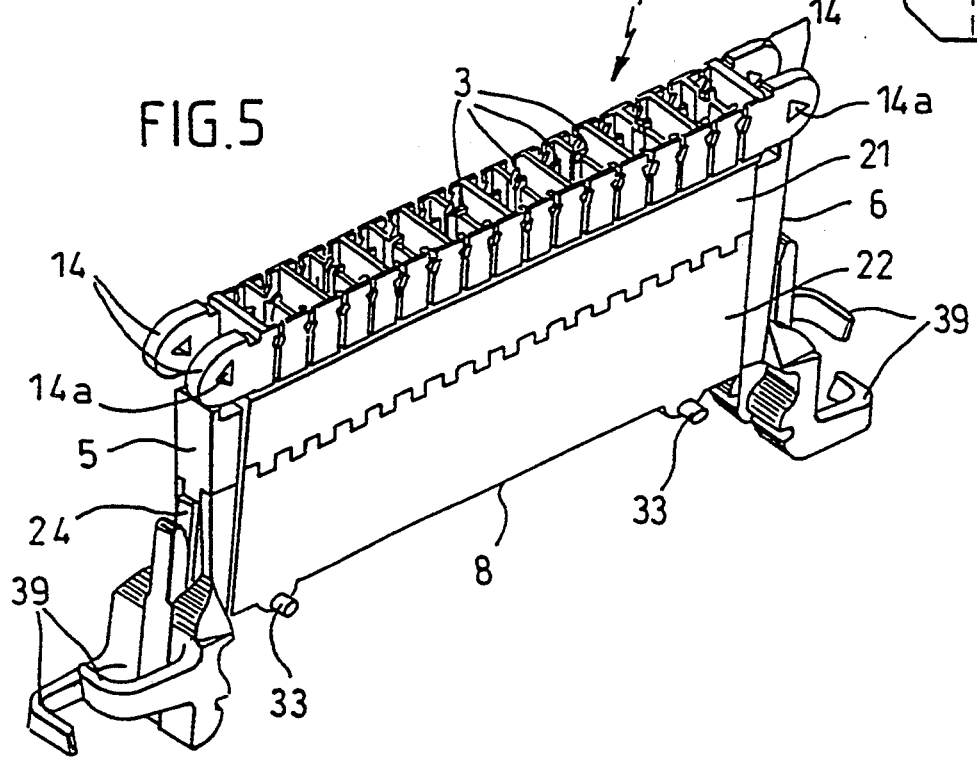

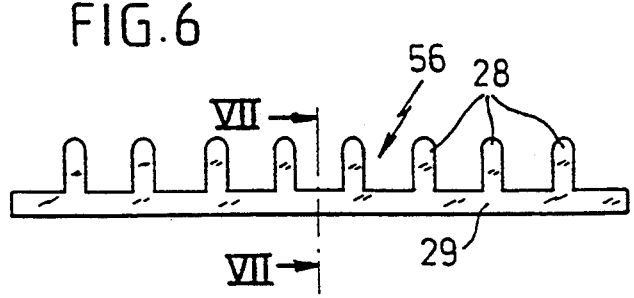
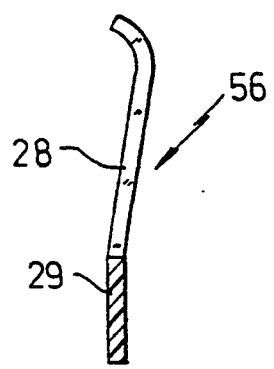
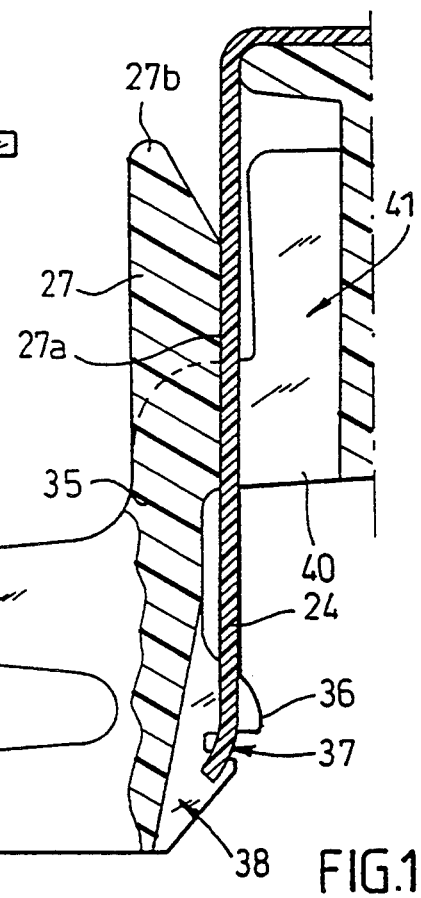
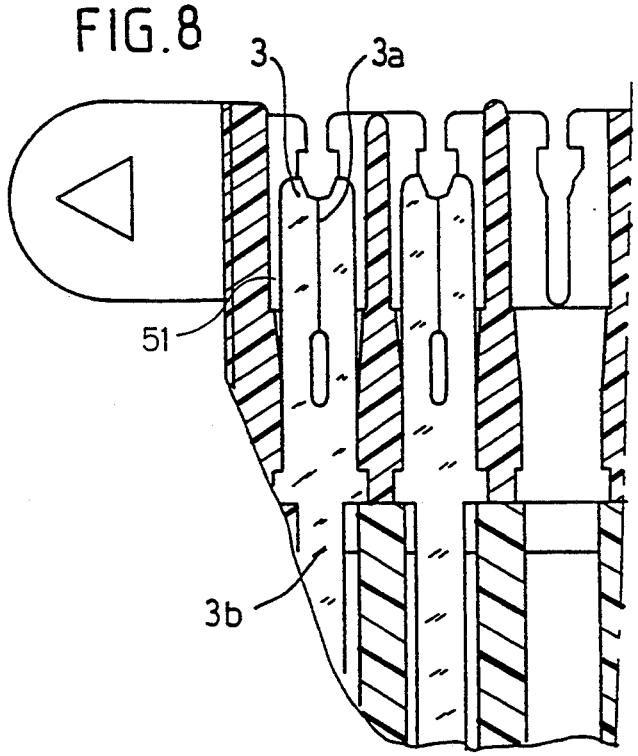
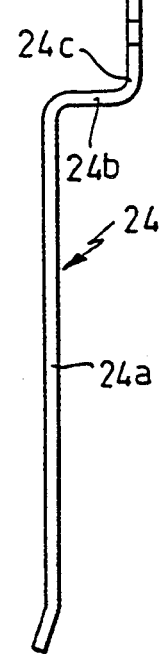
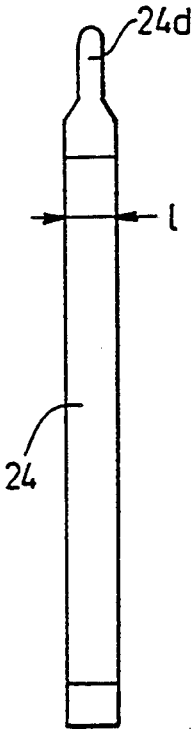

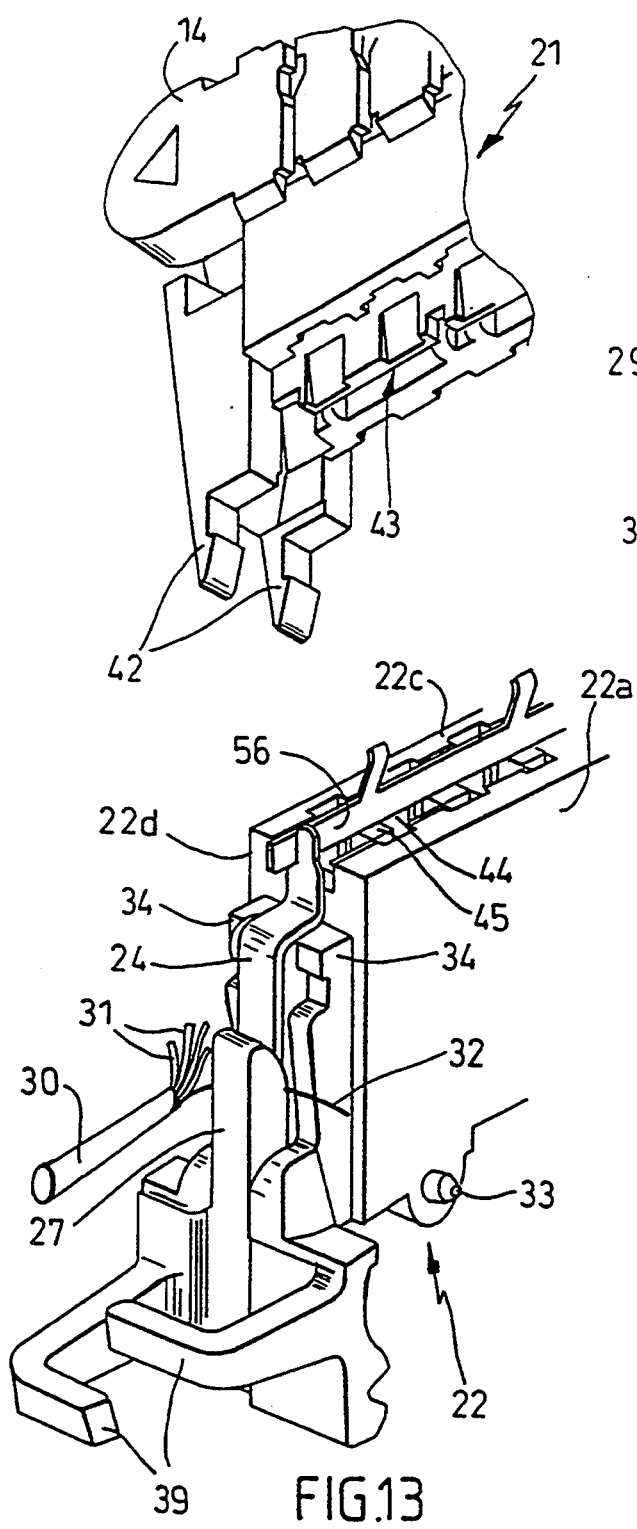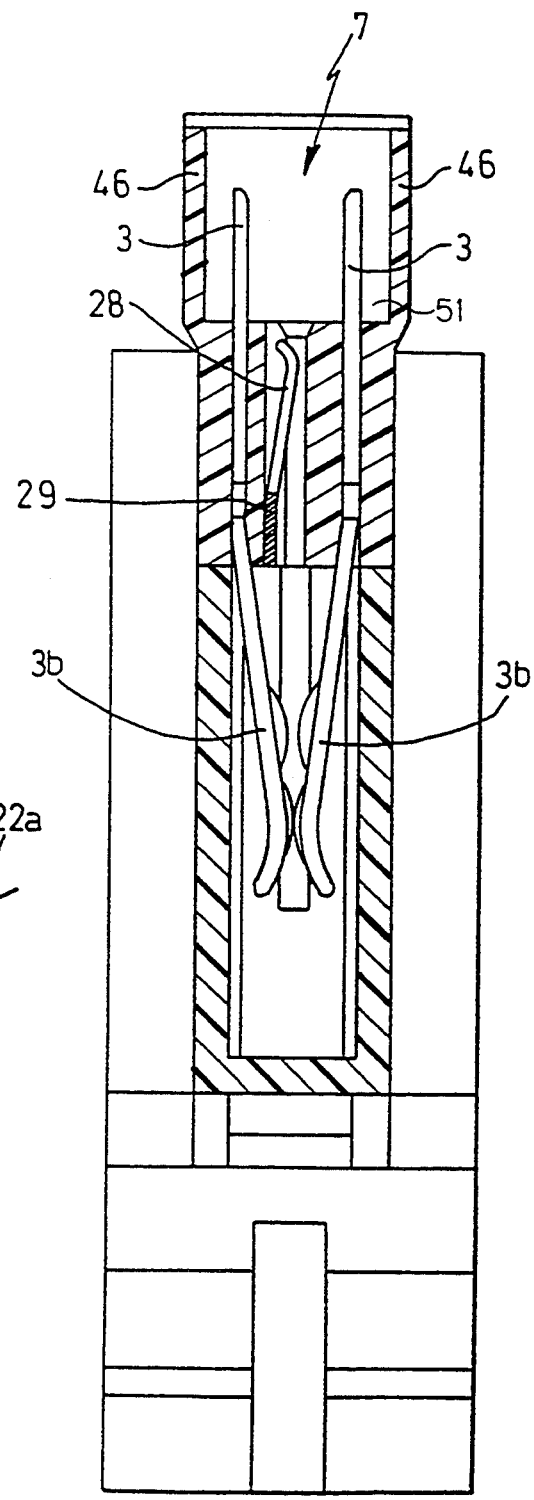
FIG.12
FIG.13
FIG.14

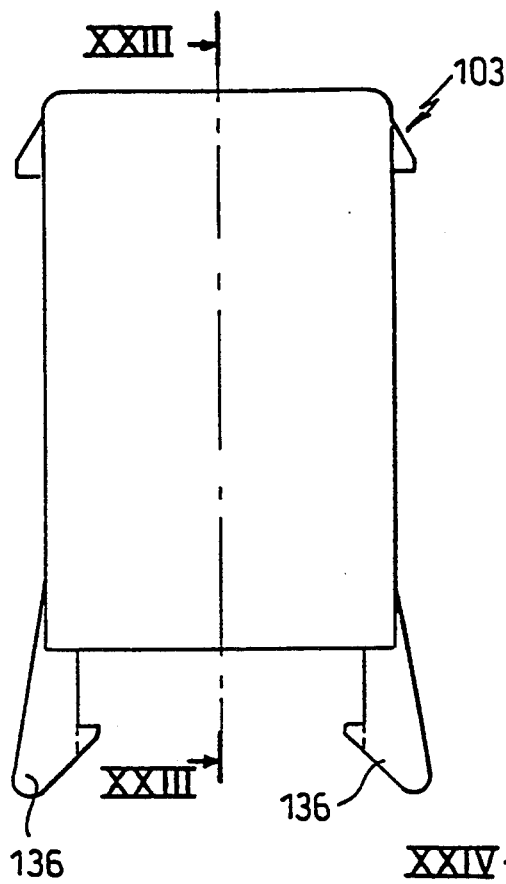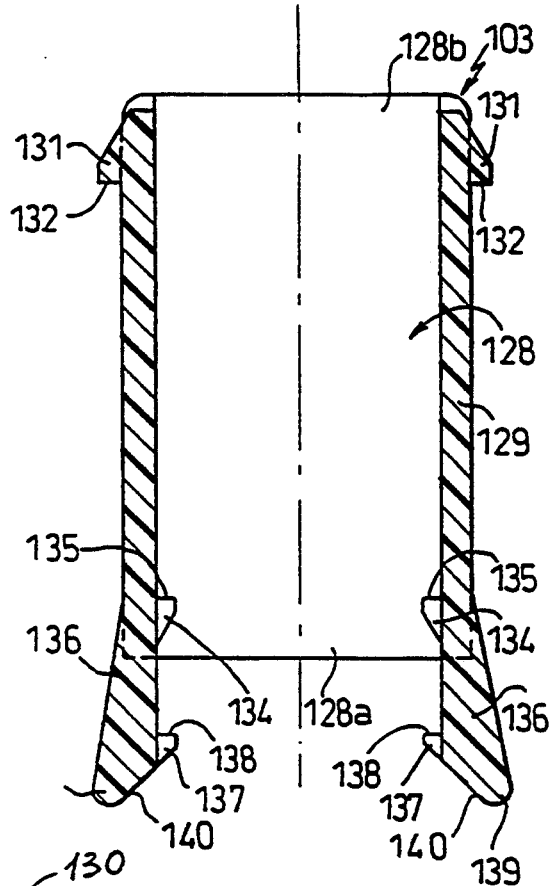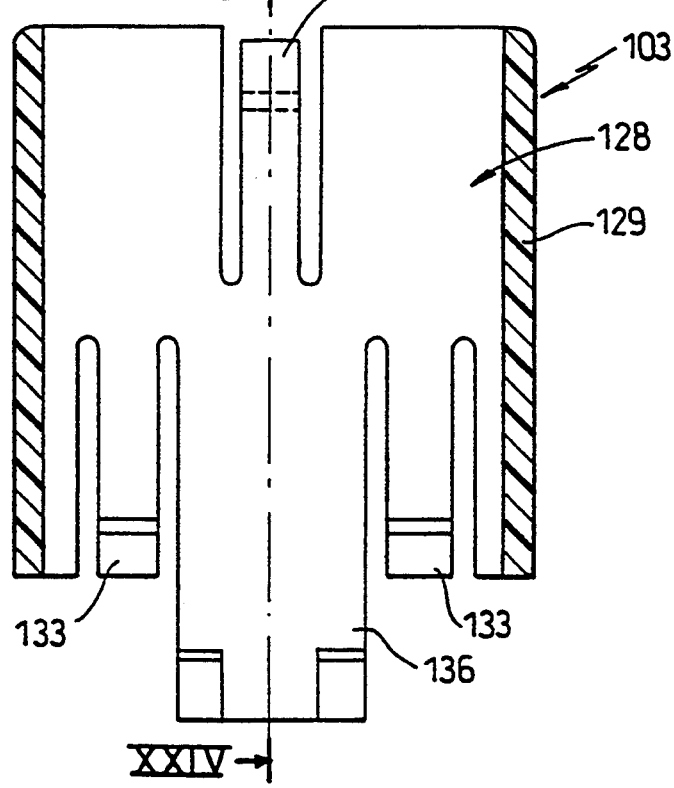

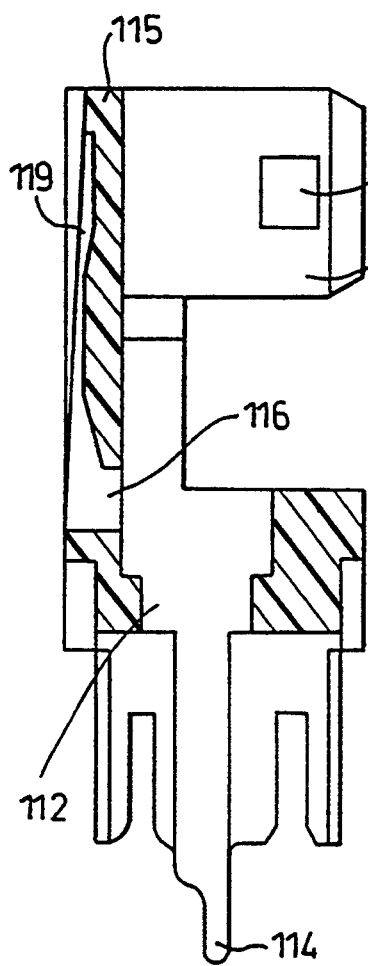
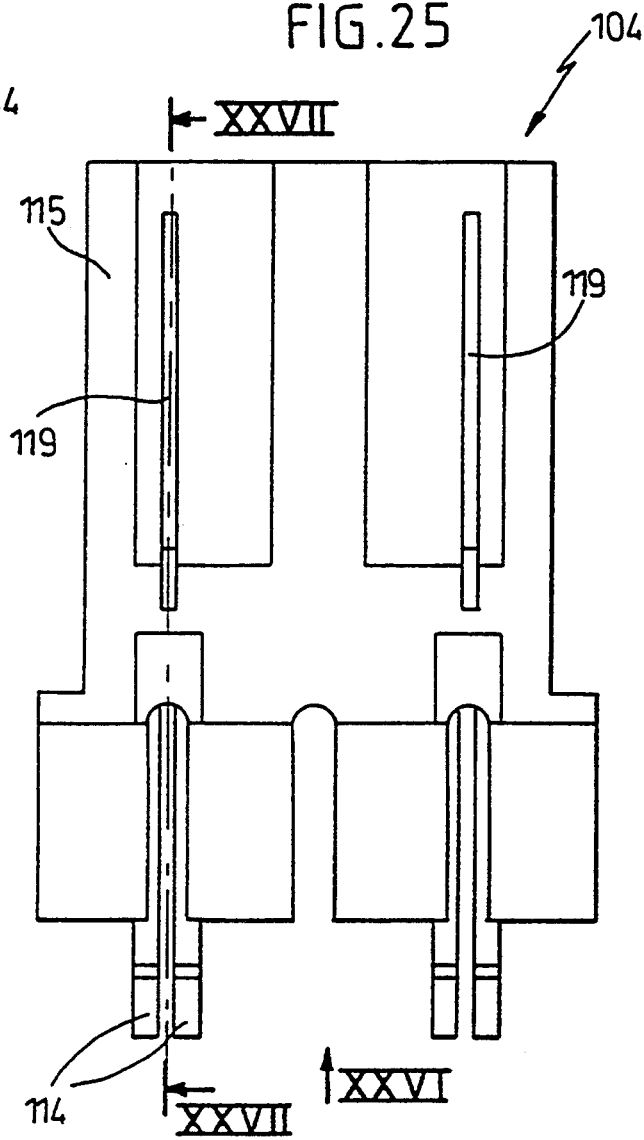
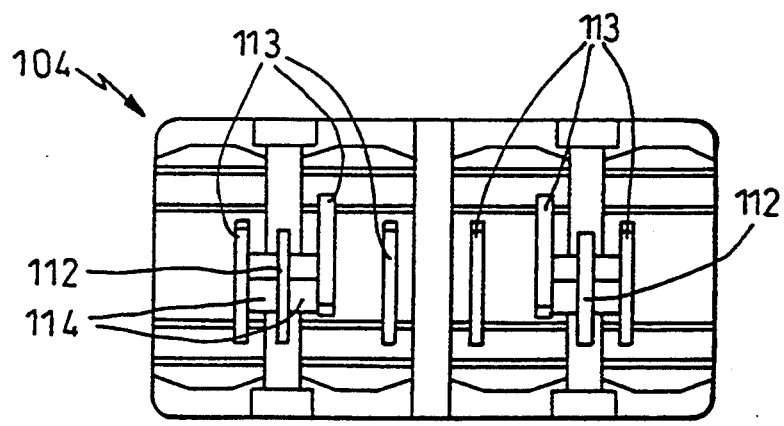

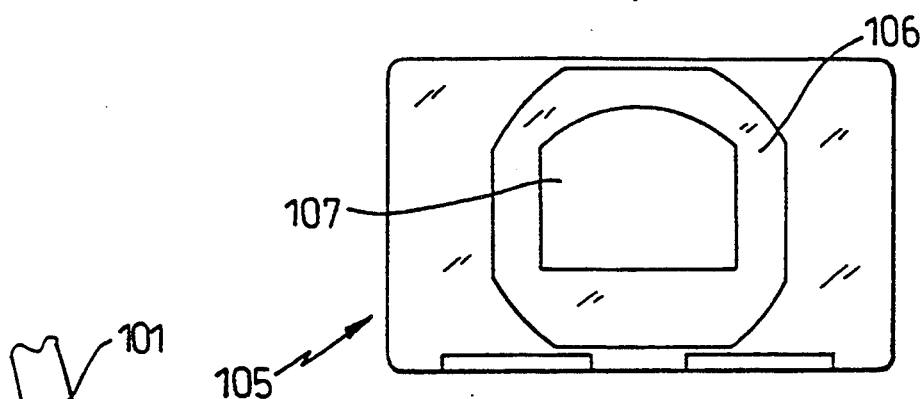
FIG. 29
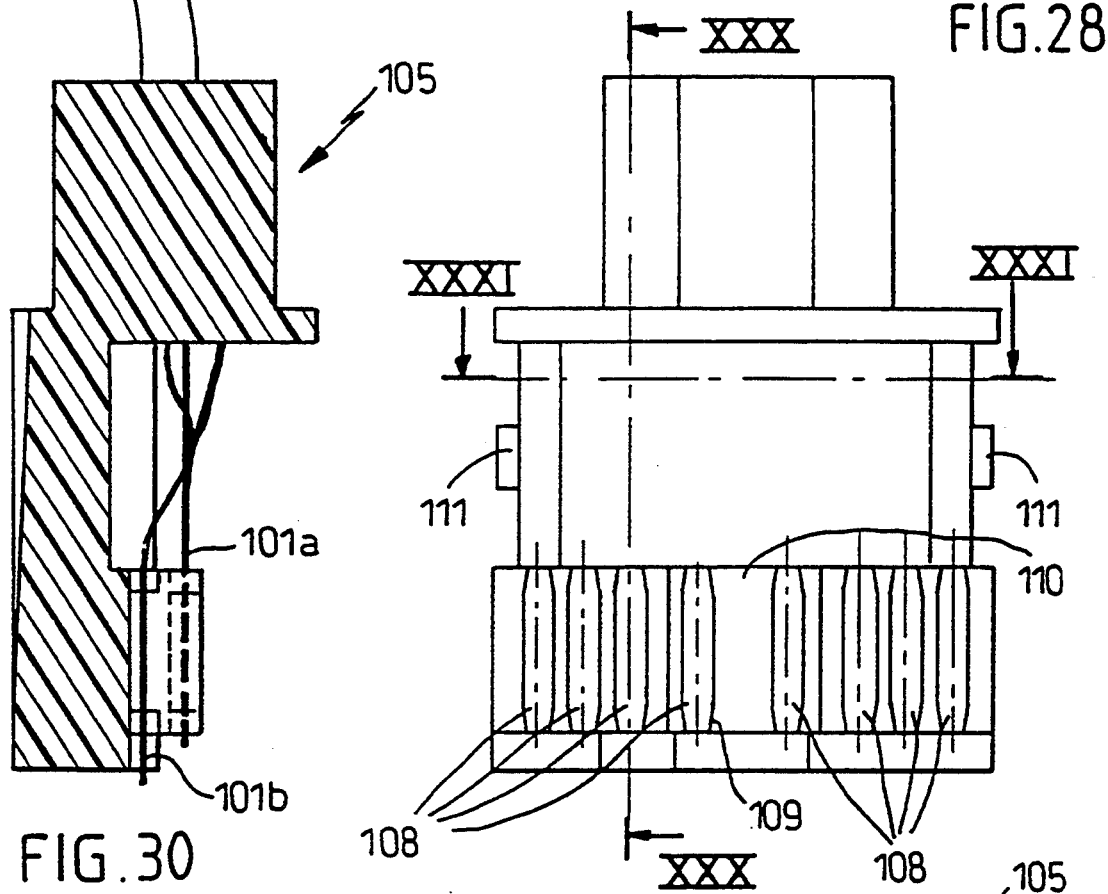
FIG. 28
FIG. 30
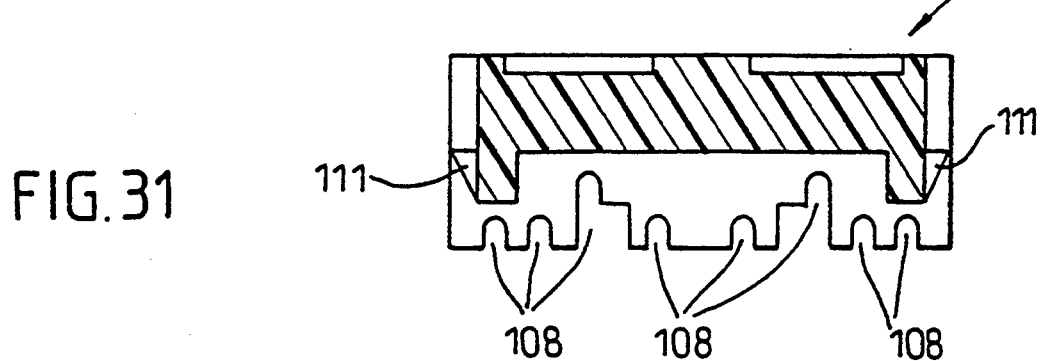
FIG. 31

CONNECTION SYSTEM USING TERMINAL STRIPS FOR USE IN HIGH BIT RATE COMMUNICATIONS

The present invention concerns a connection system using terminal strips for use in high bit rate communication systems.

BACKGROUND OF THE INVENTION

The invention is more particularly concerned with a connection system having at least one terminal strip for cable terminations as used in distribution frames for telephone, business or domestic purposes. A terminal strip of this kind comprises at least one row of contacts connected in the usual way to the conductors of a cable and to jumper links. Document EP-0 138 824 shows terminal strips of this type, for example.

Terminal strips are usually juxtaposed along the length of a grounded metal mounting rail with their lateral faces close together or in contact.

If the bit rate of the data conveyed by the terminal strips is not too high, say up to 16 Mbit/s (megabits per second), there is no particular problem in using this arrangement. However, there is a demand for ever higher bit rates and it is thought that bit rates of around 155 Mbit/s will be achieved in data networks in the relatively near future. These bit rates entail electrical currents at high frequencies which, as they travel through unscreened conductors and the contacts of such terminal strips, generate electromagnetic interference that can disrupt the operation of nearby electrical and electronic equipment and especially nearby terminal strips, in particular terminal strips fixed to the same mounting rail, as these are the nearest.

A first technical problem is to avoid interference with nearby terminal strips fixed to the same rail, whose sides are near the terminal strip producing the interference, and to limit electromagnetic radiation in other directions from the terminal strip producing the interference.

French patent application FR-A-2 340 656 mentions the use of a screen inserted between modular units. The screen is connected to appropriate grounding points and its geometrical shape is similar to that of the units.

European patent application EP-A-0 489 642 discloses a terminal strip with snap-fastener lugs for attaching the terminal strip to a rail. The strip has two ground bars which run along each of its flanks and make electrical contact with the rail through lugs and whose ends are respectively connected to a ground terminal and a ground contact. The bars cover only a miniscule part of the terminal strip flanks and are locally visible or incorporated into the terminal strip.

The prior art solutions are extremely inadequate as they entail the use of an additional component (the screens) or they isolate the terminal strips only imperfectly (ground bars).

OBJECTS AND SUMMARY OF THE INVENTION

According to the invention the above problems are solved by a connection system comprising an insulative material terminal strip and a grounded metal rail, said terminal strip having two substantially rectangular and generally planar sides extending perpendicularly to the longitudinal direction of the rail, two lateral faces, a front face carrying electrical contacts, and a back face fixed to the rail each of the sides having an outside surface, wherein the outside surfaces of said sides of the strip are formed with respective electrically conductive layers in electrical contact with the rail. The terminal strip in accordance with the invention is in one piece with the screen which is incorporated into the terminal strip so that each is individually isolated from its neighbours. The conductive layers constituting the exterior surfaces of the sides of the terminal strips form a kind of Faraday cage blocking electromagnetic radiation by the terminal strip. The incorporation of the screens and the fact that the screened terminal strips are in one piece facilitate mounting of the terminal strips on the rail, no cables being needed to connect the screens to the rail. The cost of installing a device using these terminal strips is reduced. The prior art use of separate screens between adjacent terminal strips effectively increases their thickness, requiring longer rails and increasing the overall size of the assembly. The thickness of the conductive layer is only a few microns, possibly less, and therefore has no adverse effect on the thickness of the terminal strip. Said sides of the terminal strip are advantageously insulative material flanges attached to the strip and coated with metal to constitute said electrically conductive layer. Each flange advantageously includes an elastic lug which bears elastically on the rail and is metal coated to make electrical contact between the rail and said conductive layer. The flanges may incorporate interior channels for guiding insulated conductors towards the contacts. Said channels may be coated with metal in contact with the rail to limit electromagnetic radiation parallel to the sides of the terminal strip. The flanges are advantageously removable. The invention also consists in the flange itself.

A second technical problem is to prevent a terminal strip interfering not only with the terminal strips fixed to the same rail but also with terminal strips fixed to other rails nearby, all the rails being coplanar.

According to the invention this problem is solved by a connection system as defined above in which each lateral face of the terminal strip has a metal blade substantially parallel to said lateral face and in electrical contact with the rail. Said cable advantageously further comprises a screen drain wire and said metal blade is at least partially exposed on the exterior of the terminal strip, which further comprises a presser finger on each lateral face outside the metal blade and having a bearing surface bearing elastically against the metal blade and a free end adapted to receive said drain wire and to ground it by jamming it between the metal blade and the presser finger. In an embodiment of the invention said elastic blade is urged elastically towards the presser finger by the rail. The width of the metal blade and the distance between the flanges are advantageously such that said width lies between said distance and one-third of said distance.

A third problem is to prevent or limit electromagnetic radiation from the front face of the terminal strip.

According to the invention, this problem is solved in that said connection system comprises a grounded connector fixed to the front face of the terminal strip and comprising grounded electrically conductive portions forming a screen extending substantially between the electrically conductive layers of the terminal strip.

In an embodiment of the invention, the front face of the terminal strip includes ground contacts in electrical contact with the rail, and said conductive portions of the connector forming the screen are in electrical contact with at least one of said ground contacts which are advantageously interconnected by a metal strip extending substantially between the two lateral faces of the terminal strip each of which comprises a metal blade in contact with the rail. Each metal blade in contact with said metal strip. In one embodiment of the invention said connector includes an insulative material support for conductors and contacts, a locking member fixed to said support which surrounds said support and has hooked elastic arms which cooperate with the connector to snap fasten the connector to the terminal strip, and a release member axially movable relative to the locking member which surrounds the locking member and cooperating with it to release the hooked elastic arms on the terminal strip when axial traction is applied to said release member. Said conductive portions forming the connector screen are preferably moulded from a plastics material and coated with metal.

The cable advantageously includes a screen drain wire grounded with the conductive portions of the connector forming the screen. In particular, when the connector includes a conductor and contact support, a locking member and a release member, as mentioned above, said connector advantageously includes a ground contact connected to said drain wire and the connector further includes an elastic metal blade bearing elastically against the ground contact and in sliding elastic bearing engagement with the locking member which is electrically conductive, grounded and snap-fastened to the conductor and contact support, and the terminal strip comprises a complementary ground contact in electrical contact with the ground contact of the connector and with the rail. This design greatly facilitates the grounding of the drain wires of screened cables connected to the contacts of the terminal strip by connectors at the front and could be used for this alone, without the electrically conductive layers on the sides of the terminal strip.

BRIEF DESCRIPTION OF THE DRAWINGS

Other features and advantages of the invention will emerge from the following description of an embodiment of the invention given by way of non-limiting example with reference to the accompanying drawings.

In the drawings:

FIG. 1 is a side view of a prior art terminal strip,

FIG. 2 is a perspective view of a terminal strip in accordance with the invention, FIGS. 3 and 4 are side views of two component parts of the terminal strip in accordance with the invention, FIG. 5 is a perspective view of a terminal strip in accordance with the invention without its side flanges, FIG. 6 is a side view of the ground comb from the FIG. 2 terminal strip, FIG. 7 is a view in cross-section on the line VII—VII in FIG. 6, FIG. 8 is a partial view in cross-section of the FIG. 2 terminal strip, FIGS. 9 and 10 are respectively side and front views of the lateral ground contact blade of the FIG. 2 terminal strip, FIG. 11 is a partial view in cross-section of the FIG. 2 terminal strip showing the ground contact blade from FIGS. 9 and 10, FIG. 12 is a perspective view of the upper part of the FIG. 2 terminal strip, FIG. 13 is a perspective view of the FIG. 2 terminal strip with the upper central part and the side flanges removed, FIG. 14 is a partial view in transverse cross-section of the FIG. 2 terminal strip, FIG. 22 is a side view of a locking member which cooperates with the member from FIG. 18, FIG. 23 is a view in cross-section on the line XXIII—XXIII in FIG. 22, FIG. 24 is a view in cross-section on the line XXIV—XXIV in FIG. 23, FIG. 25 is a side view of a contact support contained in the locking member from FIG. 22, FIG. 26 is a bottom view of the member from FIG. 25 as seen in the direction XXVI, FIG. 27 is a view in cross-section on the line XXVII—XXVII in FIG. 25, FIG. 28 is a side view of a conductor support contained in the locking member from FIG. 22, FIG. 29 is a top view of the conductor support from FIG. 28, FIG. 30 is a view in cross-section on the line XXX—XXX in FIG. 28, FIG. 31 is a view in cross-section on the line XXXI—XXXI in FIG. 28.

DETAILED DESCRIPTION OF THE PREFERRED EMBODIMENTS

Figure 15:
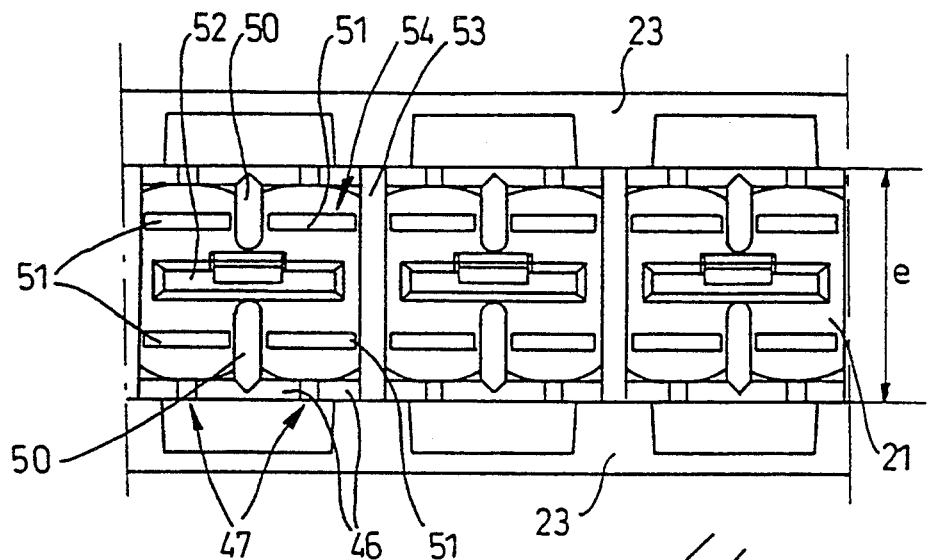
FIG. 15 shows the front of the FIG. 2 terminal strip.

FIG. 1 shows a prior art terminal strip, usually moulded from a plastics material. The terminal strip has two generally rectangular planar sides 4, two lateral faces 5, 6, a front face 7 and a back face 8. Its back face 8 snap-fastens onto a rail 2, usually a metal rail, and its front face carries one or more rows of contacts 3, usually insulation displacement contacts well-known to the person skilled in the art. The insulation displacement contacts 3 are connected to the conductors of a cable (not shown) which may be a telephone cable, a data cable, etc. The sides 4 of the terminal strip may advantageously be flanges with channels on the inside for guiding the various conductors of the cable. The insulation displacement contacts are also connected to jumper links, i.e. conductors for making cross-connections in a telephone, data or other distribution frame. The jumper links may be conductors 9 individually inserted in the slots of the insulation displacement contacts 3 or cables 11 terminated by a connector 10 which connects to the insulation displacement contacts 3.

In a telephone or data distribution frame a large number of terminal strips 1 are snap-fastened side by side to one or more rails 2.

FIG. 2 shows a terminal strip 1 in accordance with the present invention. Its shape is generally similar to that of the FIG. 1 terminal strip and is not described in detail again here. The FIG. 1 reference numbers are used again in FIGS. 2 et seq for parts similar or identical to those of FIG. 1.

Referring to FIG. 2, the terminal strip 1 in accordance with the invention may carry various labelholders, for example a front labelholder 13 which may be made from a transparent plastics material and is advantageously mounted so that it can pivot near one lateral face of the terminal strip and/or a lateral labelholder 12 which may also be made from a transparent plastics material and may also be able to pivot.

The terminal strip 1 has upper and lower central parts 21 and 22, the latter being seen particularly clearly in FIGS. 4, 5, 11 and 13. Referring to FIG. 4, the lower central part 22 has two generally rectangular planar sides 22a delimited by an upper edge 22c, a lower edge 22b and two lateral edges 22d. The lower edge 22b forms the back face 8 of the terminal strip. Each side 22a incorporates lugs 33 whose function is described later. Each lateral edge 22d comprises two snap-fastener bosses 34 whose function is described later. A leg 35 on each lateral edge 22d extends towards the rail 2 substantially parallel to said lateral edge 22d. Each leg 35 has two outwardly directed wire guide fingers 39 and two inwardly directed snap-fastener bosses 36 separated by a vertical gap 38. Each snap fastener boss 36 has a horizontal slot 37 parallel to the rail 2 and snaps onto the rail 2 when the terminal strip is attached to said rail. Each leg 35 has a presser finger 27 with a substantially planar bearing surface 27a facing the lateral edge 22d of the part 22. The presser finger 27 extends towards the front face 7 of the terminal strip and has a free end 27b. Referring to FIG. 11, the leg 35 is joined to the lateral edge 22d by two linking walls 40 substantially parallel to the sides 22a of the part 22 so that a gap 41 remains between the two linking walls 40 level with the bearing surface 27a of the presser finger 27. The lower central part 22 is hollow and has a top opening 44 interrupted by studs 45.

The upper central part 21 is seen clearly in FIGS. 3, 12 and 15. Referring to FIG. 3, it comprises two sides 21a, a lower edge 21b, an upper edge 21c which constitutes the front face 7 of the terminal strip, and two lateral edges 21d each of which incorporates two downwardly dependent snap-fastener hooks 42 which snap into the snap-fastener bosses 34 of the lower central part 22 when the two parts are assembled as shown in FIG. 5. Each lateral edge 21d further comprises a boss 14 with orifices 14a for snap-fastening pivoted labelholders. The lower edge 21b of the upper central part 21 further comprises a passage 43 extending substantially all the way along it. Referring to FIG. 15, the upper edge 21c of the upper central part 21 comprises on each side 21a a series of crests 46 parallel to each side 21a separated by vertical slots 47 each of which has a downwardly directed shoulder 48 on each side. Alternate crests in each row are joined to a vertical partition 53 perpendicular to the crest extending as far as the other side of the central part 21. The intermediate crests comprise a vertical wall 50 extending partway towards the other side of the central part 21. The partitions 53 delimit compartments 54 each comprising four lateral wells 51 and a central well 52. The lateral wells 51 and the central well 52 communicate with the passage 43 at the lower edge 21b of the upper central part 21. The lateral wells 51 are substantially rectangular and are arranged in two rows each near one lateral edge 21a of the central part 21. The lateral wells 51 of one row each face one well 51 of the other row. The central wells 52 are also substantially rectangular and arranged in a row between the two rows of lateral wells 51. Each central well 52 extends substantially the length of two aligned lateral wells 51 of each row in each compartment 54.

Figure 17:
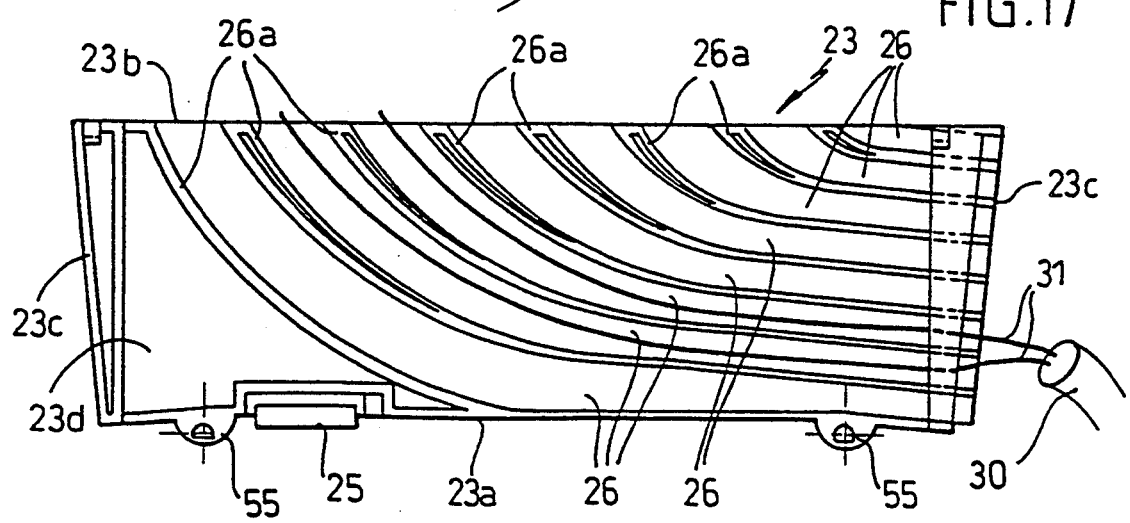
FIG. 17 is a side view of a lateral flange of the FIG. 2 terminal strip.
Figure 18:
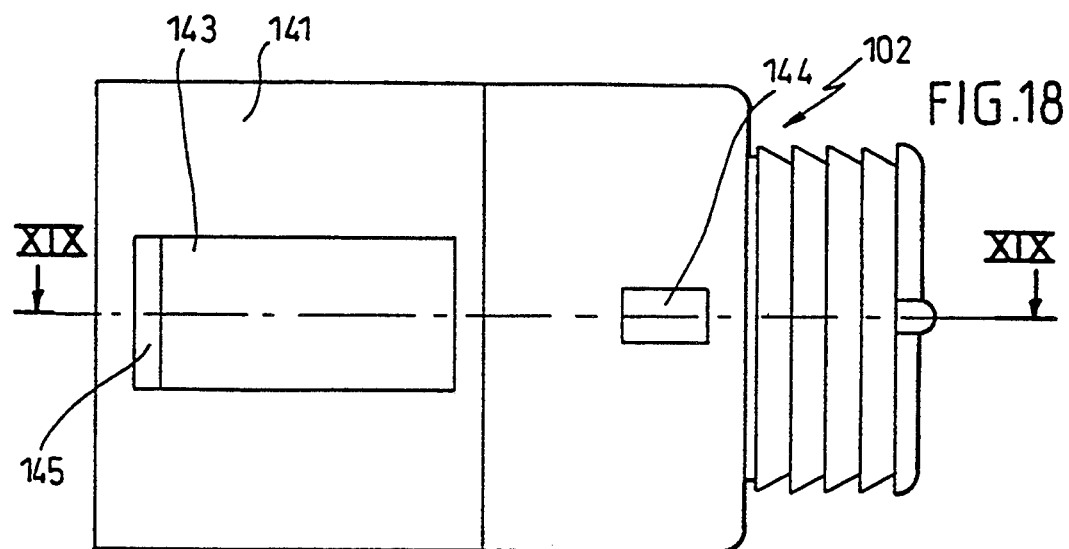
FIG. 18 is a side view of the release member of a connector that can be plugged into the front of the FIG. 2 terminal strip.
Figure 19:
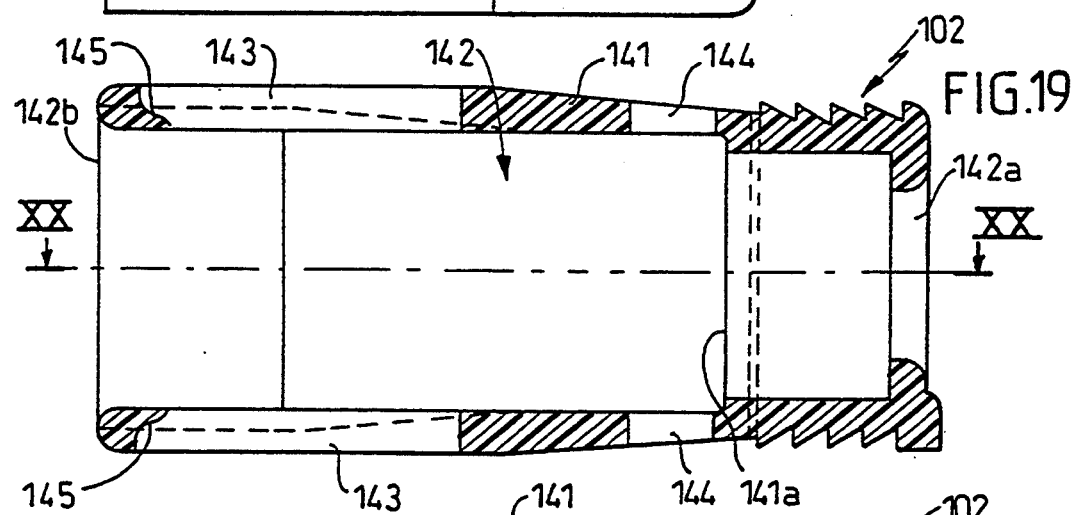
FIG. 19 is a view in cross-section on the line XIX—XIX in FIG. 18.
Figure 20:
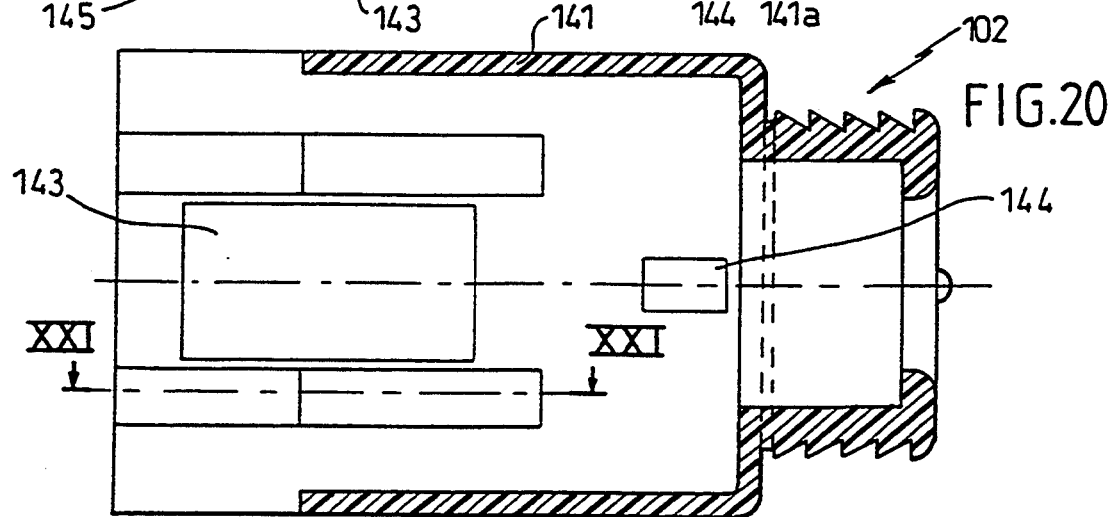
FIG. 20 is a view in cross-section on the line XX—XX in FIG. 19.
Figure 21:
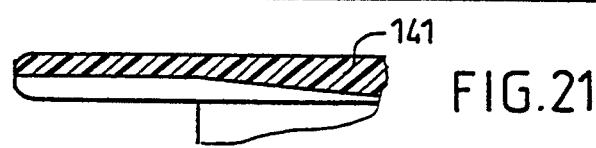
FIG. 21 is a view in cross-section on the line XXI—XXI in FIG. 20.

Referring to FIGS. 2 and 17, the terminal strip further includes two flat side flanges 23 fixed to each side of the central parts 21 and 22. Each side flange 23 is substantially rectangular and has a lower edge 23a, an upper edge 23b, two lateral edges 23c and an inside surface 23d lying against the central parts 21 and 22 and comprising guide channels 26 delimited by walls 26a perpendicular to said flanges 23, opening onto the upper edge 23b of the flange 23 and onto one of its lateral edges 23c and adapted to receive insulated conductors 32 of a cable 30 and to guide them towards the contacts on the front face 7 of the terminal strip. Each side flange 23 further comprises holes 55 adapted to receive the lugs 33 on the lower central part 22 to attach the side flanges to the terminal strip and an elastic lug 25 extending perpendicularly to the side 4 of the terminal strip 1 under the lower central part 22 and bearing elastically against the metal rail 2 when the terminal strip 1 is fixed to said rail. Each flange is entirely coated with a conductive metal so that the flanges 23 are grounded via the rail 2. This limits electromagnetic radiation from the insulated conductors 31 perpendicular to the side 4 of the terminal strip. As the insulated conductors 31 are in the channels 26 between the walls 26a which have a grounded metal coating electromagnetic radiation towards the front and towards the lateral faces of the terminal strip is also limited.

The terminal strip further includes on each lateral face a grounded metal blade 24 made by stamping and bending sheetmetal and clearly visible in FIGS. 9, 10, 11 and 13. The width 1 of the metal blade 24 may be about one third of the distance e between the flanges 23 (see FIG. 15), for example, or any value between this and a value equal to the distance e. The metal blade 24 has a straight vertical first part 24a extended at the top by a straight horizontal part 24b extended upwardly by a second straight vertical part 24c which has a smaller section 24d at the top. The first straight vertical part 24a of the metal blade 24 bears elastically against the bearing surface 27a of the presser finger 27 (FIG. 11) and passes through the gap 41 between the two linking walls 40 into the gap 38 between the two snap-fastener bosses 36 of the leg 35 of the lower central part 22. When the slots 37 of the snap-fastener bosses 36 are snapped onto the rail 2 the latter bears on said first vertical part 24a of the metal blade and deforms it towards the leg 35 and so urges said metal blade 24 elastically against the bearing surface 27a of the presser finger 27. The horizontal part 24b of the metal blade enters the terminal strip between the upper and lower central parts 21 and 22 and its second vertical part 24c enters the passage 43 of the upper central part 21. Referring to FIG. 13, this arrangement enables grounding of a drain wire 32 of a screened cable 30 whose conductors 31 are guided by the channels 26 in the flanges 23. The drain wire 32 of the cable 30 is not usually insulated and is grounded simply by jamming it between the presser finger 27 and the metal blade 24 which is in contact with the grounded rail 2. Because they are grounded, the metal blades 24 form a screen which greatly reduces electromagnetic radiation from the lateral faces 5 and 6 of the terminal strip.

Referring to FIGS. 6, 7, 13 and 14, the terminal strip further comprises a metal grounding comb 56 made by stamping and bending sheetmetal and comprising a metal strip 29 accommodated in the passage 43 in the upper part 21 of the terminal strip and extending substantially the full length of said terminal strip between the lateral faces 5 and 6. Referring to FIG. 13, the strip 29 rests on the studs 45 which interrupt the top opening 44 of the lower central part 22. Each end of the metal strip 29 is in contact with the narrower part 24d of the metal blade 24. Referring to FIGS. 6 and 7, the grounding comb 56 further comprises elastic contact fingers 28 each centrally located in one of the central wells 52 already described.

Referring to FIGS. 8 and 14, the lateral wells 51 of the terminal strip each house an insulation displacement contact 3 which conventionally has an upward facing slot 3a into which an insulated conductor can be forced and which cuts through the insulation to make contact between the insulation displacement contact 3 and the conductor. Each insulation displacement contact 3 has a downward extension 3b contacting the extension 3b of the facing insulation displacement contact 3. This contact can be broken by inserting an insulative plate (not shown) into the central well 52 between the two facing contacts 3. The invention is not limited to a terminal strip having single slot insulation displacement contacts 3 or to a terminal strip having insulation displacement contacts facing each other and/or having extensions 3b in elastic contact. The invention applies equally to terminal strips having one or more rows of insulation displacement contacts at the front regardless of their configuration.

Figure 16:
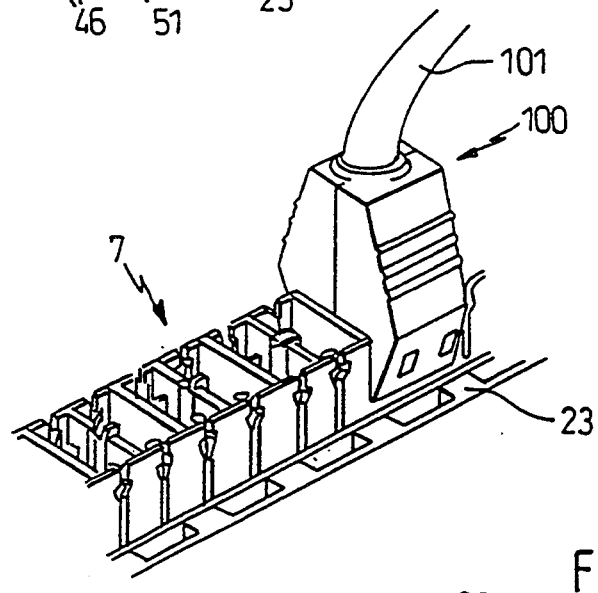
FIG. 16 is a perspective view of the front of the FIG. 2 terminal strip with a connector plugged into it.
Figure 32:
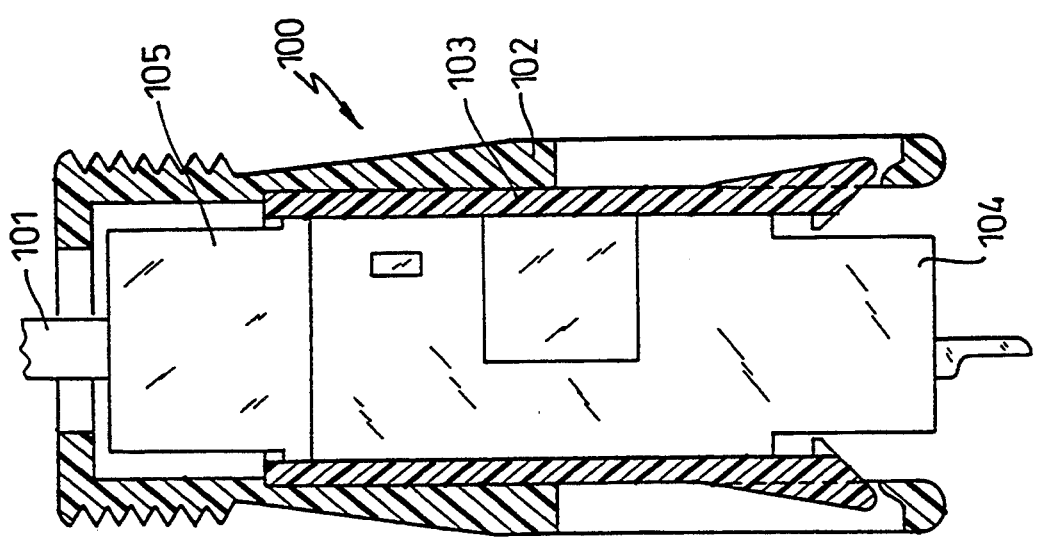
FIG. 32 is a partial view in cross-section of a connector comprising the members from FIGS. 18 through 31, FIGS. 33 and 34 are views in cross-section of parts of the FIG. 32 connector.

Referring to FIG. 16, the contacts 3 may be connected to a connector 100 connected to a cable 101 as well as to the conductors 31 in the guide channels 26 of the flanges 23. The FIG. 16 connector 100 is connected only to the other contacts of a compartment 54 but it could be connected to the eight contacts of two contiguous compartments. FIGS. 18 through 36 show a connector 100 of this kind designed to occupy two contiguous compartments. It is advantageously of the "push-pull" type, i.e. it snap-fastens to the terminal strip 1 when it is plugged in and requires a release member to be pulled to unplug it. Referring to FIG. 32, the connector 100 comprises a contact support 104, a conductor support 105 fixed to said contact support 104, a locking member 103 fixed to and surrounding the conductor and contact supports 104 and 105 and a release member 102 which slides relative to and surrounds the locking member 103. The various members 102 through 105 are usually moulded from a plastics material and the members 102 and 103 have a conductive metal coating.

FIGS. 28 to 31 show the conductor support 104. Referring to FIG. 29, it comprises a conduit 106 at the top defining a passage 107 for the cable 101 and eight conductor channels 108 at the bottom. The channels 108 are open at the sides (see FIG. 31) and each receives an insulated conductor of the cable 101, either a data conductor 101b or a screen drain wire 101a. There are eight insulated conductors in all, six data conductors 101b and two screen drain wires 101a. Each conductor channel 108 has narrower sections at the bottom (109) and at the top (110) to wedge the conductors 101a and 101b in place. As shown in FIGS. 28 and 31, the conductor support 105 comprises two snap-fastener hooks 111 at the sides. Their function is described later.

The connector 100 further comprises a contact support 104 shown in FIGS. 25 through 27 in particular. It has eight contact housings, namely two ground contact housings 112 and six data contact housings 113. Each ground contact housing 112 lies between two projecting stiffener fingers 114 seen clearly in FIGS. 25 and 27. The contact support 104 further comprises a lateral wall 115 from which extend two perpendicular fixing walls 117 each having a hole 118 in it receiving one of the hooks 111 when the parts 104 and 105 are assembled together. The lateral wall 115 also has two vertical grooves 119 on its outside each communicating at the bottom with a ground contact housing 112 via a hole 116.

Figure 33:
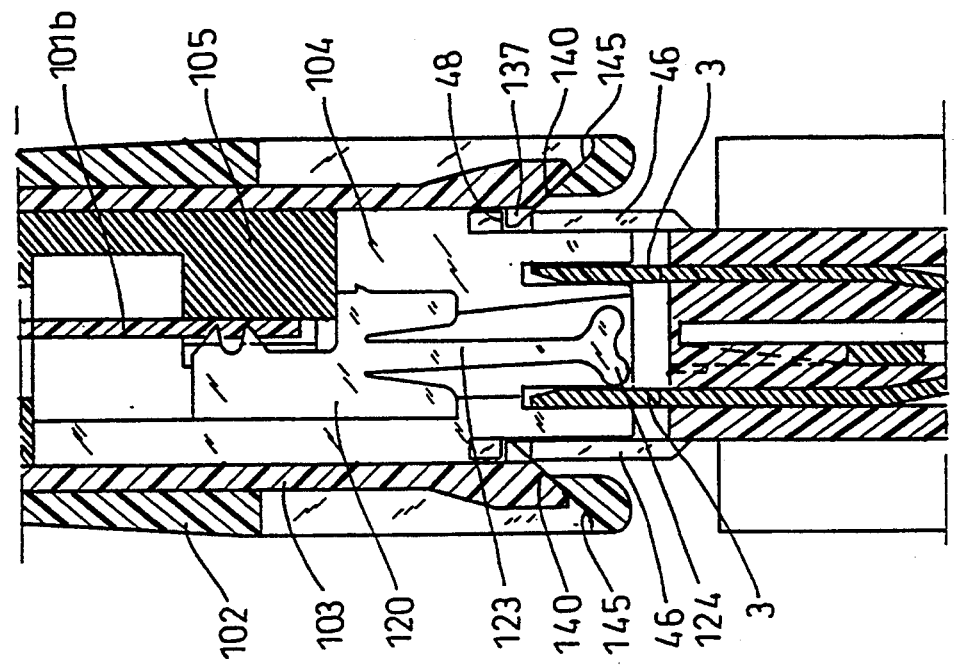
Figure 35:
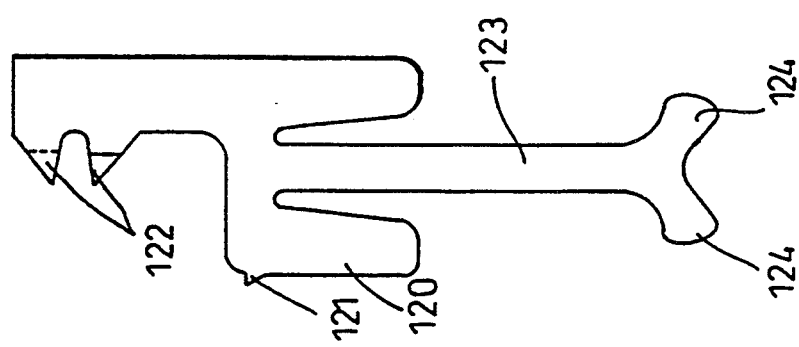

The contact support 104 supports data contacts 120 like that shown in FIGS. 33 and 35 stamped from sheetmetal and each of which has a detent 121 which is embedded in the plastics material of the support 104 to fix the contact 120 in its housing 113 and two points 122 which enter one of the conductor channels 108 when the conductor support 105 is fixed to the contact support 104, said points 122 piercing the insulation around the conductor in the channel 108 to make electrical contact between the conductor 101b and the data contact 120 which also has a relatively thin rod 123 extending downwards towards the front 7 of the terminal strip when the connector 100 is plugged into the terminal strip. Said rod 123 ends at two lateral appendages 124. When the connector 100 is plugged into the terminal strip 1 as shown in FIG. 33 one appendage 124 of the rod 123 bears elastically against an insulation displacement contact 3, slightly deforming the rod 123. Four of the six data contacts 120 are connected to the four insulation displacement contacts of one row in the two compartments that the connector 100 spans and two of them are connected to two insulation displacement contacts 3 of the other row (usually to identify the contacts).

Figure 36:
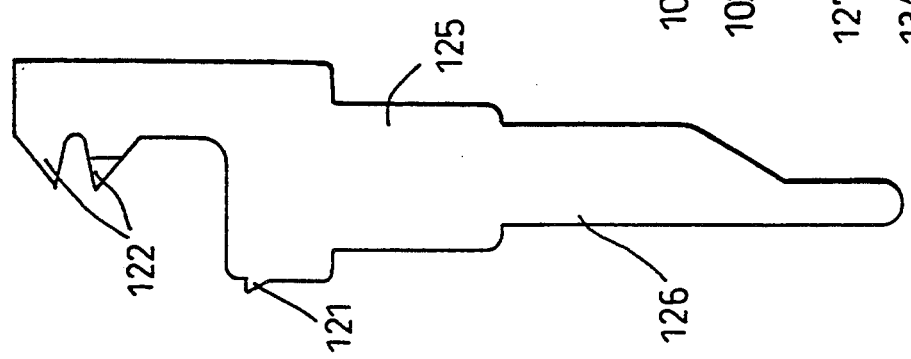
FIGS. 35 and 36 are side views of the contacts of the FIG. 32 connector.

FIG. 36 shows one of the ground contacts 125 fixed in the contact support 104. Like the data contacts 120, it comprises a detent 121 to fix the contact 125 into the support 124 and two points 122 to make an electrical connection to a drain wire 101a of a screened cable 101. The ground contact 125 has a finger 126 extending downwards towards the terminal strip 1 when the connector 100 is connected to it, at which time the end of the finger 126 enters a central well 52 of the terminal strip and contacts the elastic finger 28 of the grounding comb in said well 52. The finger 126 projects towards the front of the connector and the stiffener fingers 114 of the contact support prevent deformation of the finger 126 due to impact. However, the finger 126 projects slightly relative to the stiffener fingers 114 so that electrical contact can be established between the finger 126 and the elastic fingers 28 of the grounding comb.

The connector 100 also has a locking member 103 shown in FIGS. 22 through 24. It is hollow and defines a rectangular cross-section central conduit 128 delimited by a side wall 129, extending axially between a lower open end 128a and an upper open end 128b and receiving the contact support 104 and the conductor support 105 when said parts 104 and 105 are assembled together. The lateral walls 129 have axial cut-outs defining upwardly directed elastic fingers 130 on their opposite sides each having an outwardly facing snap-fastener hook 131 with a downwardly facing shoulder 132, four downwardly directed elastic fingers 133 arranged in pairs on two opposite sides each having an inwardly facing hook 134 with an upwardly directed shoulder 135, and two elastic fingers 136 projecting axially downwardly on two opposite sides. Each elastic finger 136 has two inwardly facing hooks 137 with an upwardly directed shoulder 138 and said elastic hooks 136 diverge at their free ends 139 each of which has a slantwise cam surface 140 sloping upwardly and towards the inside of the locking member 103.

Figure 34:
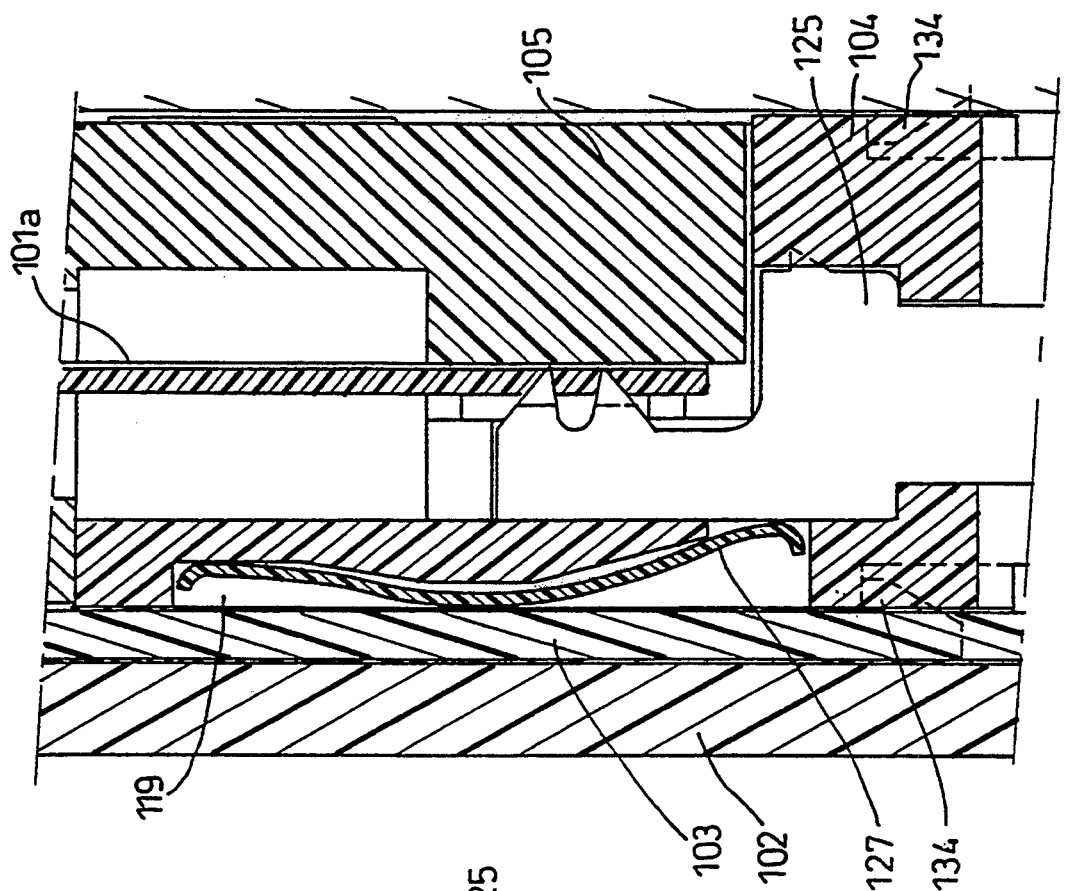

Referring to FIG. 34, before the assembled supports 104 and 105 are inserted in the locking member 103, where they are retained by its hooks 134, an elastic metal blade 127 is placed in each axial slot 119 of the contact support 104. It is compressed by the side wall of the locking member 103 when the supports 104 and 105 are inserted in the locking member 103 and then bears elastically against the ground contact 125 for this axial slot and slides in elastic bearing engagement with the side wall of the locking member 103 which, as it is coated with metal, constitutes a screen grounded via the elastic metal blade 127 of the ground contact 125, the grounding comb, the metal blades 24 and the rail 2. It therefore prevents electromagnetic radiation from the front face 7 of the terminal strip at the two compartments 54 containing the connector 100. This prevention of electromagnetic radiation from the front face of the terminal strip is especially effective if connectors 100 cover all of the front face of the terminal strip.

The connector 100 further comprises a release member 102 shown in FIGS. 18 through 21 and comprising a side wall 141 delimiting a substantially rectangular cross-section axial conduit 142 having a rear end 142a and a front end 142b. The side wall 141 includes two opposite openings 143, two opposite openings 144 and a downwards facing internal shoulder 141a. The conduit 142 receives the locking member 103 which slides with lost motion inside the release member 104. The hooks 131 on the locking member 103 snap into the openings 144 on the release member 102 and sliding of the locking member 103 within the release member 102 is limited by the shoulders 132 of said hooks 131 and the shoulder 141a of the release member 102 against which the locking member 103 abuts. The openings 143 in the release member 102 receive the elastic fingers 136 whose free ends 139 enter said openings 143 which have a slantwise lower edge 145 facing outwards and downwards whose function is explained below. The connector 100 is assembled as follows: The locking member 103 is first inserted in the release member 102 and this combination is threaded onto the cable 101 whose conductors 101a and 101b are fixed to the connector support 105 which is assembled to the contact support 104 fitted with its contacts. The elastic blades 127 are fitted to the contact support 104 and the assembly comprising the supports 104 and 105 is then inserted in the locking member 103, the elastic fingers 133 of the locking member 103 spreading elastically. This is possible because the side wall 141 of the release member 102 has openings 146 aligned with these elastic fingers.

Referring to FIG. 33, when the connector 100 is connected to the terminal strip 1 the hooks 137 on the locking member 103 snap onto the shoulders 48 of the crests 46. To unplug the connector 100 the release member 102 is pulled in the axial direction so that the lower edge 145 of each opening 143 pushes the elastic arms 136 outwards by means of the cam surface 140 of said elastic arms. This releases the hooks 137 from the shoulders 48 to allow the connector 100 to be unplugged from the terminal strip.

The release member 102 is made of metal and is grounded via the locking member 103. The members 102 and 103 extend substantially from one lateral flange 23 to the other and therefore constitute a good screen against electromagnetic radiation from the front face of the terminal strip.

I claim:

1. A connection system adapted to receive insulated conductors connected to electrical contacts, comprising; a terminal strip of insulating material and a metal rail connected to ground, said terminal strip having two substantially rectangular and generally planar sides extending perpendicularly to a longitudinal direction of the rail, two lateral faces, a front face provided with said electrical contacts, and a back face fixed to the rail, each of the sides having an outside surface, wherein the outside surfaces of said sides of the strip are formed with respective electrically conductive layers in electrical contact with the rail, wherein each of said sides of the strip comprises a flange of insulating material attached to said strip, said flanges being coated with a metal deposit which constitutes said electrically conductive layers, and wherein said flanges include interior channels for receiving said insulated conductors and for guiding them towards said contacts, said interior channels being coated with the metal deposit that is in electrical contact with the rail.

2. A connection system according to claim 1 in which each of said flanges includes an elastic lug which bears elastically against the rail, said elastic lug itself being coated with a metal deposit to establish the electrical contact between the rail and said conductive layer.

3. A connection system according to claim 1, in which each lateral face of the strip is provided with a metal blade that is substantially parallel to said lateral face, said metal blade being in contact with the rail.

4. A connection system according to claim 3, suitable for receiving a cable containing conductors connected to the contacts, said cable further including a screen drain wire, wherein said metal blade is exposed, at least in part, outside the strip, the strip further includes a presser finger which is disposed on each lateral face of the strip outside the metal blade, said presser finger having a bearing surface bearing elastically against the metal blade, and a free end for receiving said screen drain wire and connecting it to ground by jamming it between the metal blade and the presser finger.

5. A connection system according to claim 4, in which said metal blade is urged elastically towards the presser finger by the rail.

6. A connection system according to claim 3, in which the metal blade is of width 1 and the flanges are spaced apart by a distance e such that said width 1 lies between said distance e and one-third of said distance e.

7. A connection system according to claim 4, including at least one connector fixed on the front face of the strip and connected to a cable, said connector being connected to contacts of the strip, wherein said connector includes electrically-conductive screen-forming portions which are connected to ground, and said conductive portions extend substantially between the electrically conductive layers of the strip.

8. A connection system according to claim 1 in which the flanges are removable.

9. A connection system, comprising: a terminal strip of insulating material and a metal rail connected to ground, said terminal strip having two substantially rectangular and generally planar sides extending perpendicularly to a longitudinal direction of the rail, two lateral faces, a front face provided with electrical contacts, and a back face fixed to the rail, each of the sides having an outside surface, wherein the outside surfaces of said sides of the strip are formed with respective electrically conductive layers in electrical contact with the rail, and further comprising at least one connector fixed on the front face of the strip and connected to a cable, said connector being connected to contacts of the strip, wherein said connector includes electrically-conductive screen-forming portions which are connected to ground, and said conductive portions extend substantially between the electrically conductive layers of the strip.

10. A connection system according to claim 9, in which the front face of the strip includes grounding contacts in electrical contact with the rail and said screen-forming conductive portions of the connector are in electrical contact with at least one of said grounding contacts.

11. A connection system according to claim 10, in which said grounding contacts are interconnected by a metal strip extending substantially between the two lateral faces of the strip, each lateral face includes a metal blade in contact with the rail, and each metal blade is in contact with said metal strip.

12. A connection system according to claim 9, in which said connector includes a conductor and contact support of insulating material, a locking member fixed to said support, surrounding said support, and including elastic hooked arms which cooperate with the strip to snap fasten the connector on the strip, and a release member axially movable relative to the locking member, surrounding the locking member, and cooperating with the locking member to release the hooked elastic arms from the strip when axial traction is applied to said release member, and in which said screen-forming conductive portions of the connector are constituted by at least one of said locking member and said release member.

13. A connection system according to claim 12, in which said screen-forming conductive portions of the connector are molded from a plastics material and are covered in a metal deposit.

14. A connection system according to claim 9, in which the cable includes a screen drain wire which is itself connected to ground with the screen-forming conductive portions of the connector.

15. A connection system according to claim 12, in which said connector includes a ground contact connected to said screen drain wire, and the connector further includes a metal elastic blade bearing elastically against the ground contact and in sliding elastic bearing engagement against the locking member, said locking member being electrically conductive and connected to ground, said locking member being fixed to the contact and conductor support by interfitting and snap-fastening; and the strip includes a complementary grounding contact in electrical contact with the ground contact of the connector and with the rail.

* * * * *